(12) United States Patent
Kondo

(10) Patent No.: US 9,818,533 B2
(45) Date of Patent: Nov. 14, 2017

(54) WINDING APPARATUS

(71) Applicant: NITTOKU ENGINEERING CO., LTD., Saitama-shi, Saitama (JP)

(72) Inventor: Koji Kondo, Fukushima (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 196 days.

(21) Appl. No.: 14/426,929

(22) PCT Filed: Aug. 26, 2013

(86) PCT No.: PCT/JP2013/072768
§ 371 (c)(1),
(2) Date: Mar. 9, 2015

(87) PCT Pub. No.: WO2014/045808
PCT Pub. Date: Mar. 27, 2014

(65) Prior Publication Data
US 2015/0243436 A1 Aug. 27, 2015

(30) Foreign Application Priority Data
Sep. 20, 2012 (JP) .................................. 2012-206684

(51) Int. Cl.
*B23P 19/00* (2006.01)
*H05K 13/04* (2006.01)
(Continued)

(52) U.S. Cl.
CPC ....... *H01F 41/0612* (2013.01); *H01F 41/064* (2016.01); *H02K 15/085* (2013.01); *Y10T 29/49071* (2015.01); *Y10T 29/5313* (2015.01)

(58) Field of Classification Search
CPC .. H02K 15/066; H02K 15/085; H01F 41/064; H01F 41/0612
See application file for complete search history.

(56) References Cited

U.S. PATENT DOCUMENTS 6,009,618 A * 1/2000 Takahata ............ H02K 15/0457
140/92.2
8,393,072 B2 * 3/2013 Bodin ................ H02K 15/0478
29/596
(Continued)

FOREIGN PATENT DOCUMENTS

CN 1756048 A 4/2006
JP 08-308188 A 11/1996
(Continued)

*Primary Examiner* — Paul D Kim
(74) *Attorney, Agent, or Firm* — Rabin & Berdo, P.C.

(57) ABSTRACT

A winding apparatus includes a nozzle for feeding a wire to a first end side of a magnetic pole in a winding position, a first latch pawl capable of latching the wire fed from the nozzle, a first latch pawl moving mechanism that moves the first latch pawl from the first end side to a second end side of the multi-pole armature, and a nozzle moving mechanism that moves the nozzle in both the radial direction and the circumferential direction of the multi-pole armature. A width of the first latch pawl in the circumferential direction of the multi-pole armature is set at a width enabling insertion of the wire wound around and bent back by the first latch pawl into slots formed on both sides of one or more of the magnetic poles in the winding position.

4 Claims, 15 Drawing Sheets

(51) Int. Cl.
*H01F 41/06* (2016.01)
*H02K 15/085* (2006.01)
*H01F 41/064* (2016.01)

(56) References Cited

U.S. PATENT DOCUMENTS

| | | | |
|---|---|---|---|
| 9,071,115 B2* | 6/2015 | Bodin | H02K 3/12 |
| 2003/0085314 A1 | 5/2003 | Takano et al. | |
| 2004/0046476 A1* | 3/2004 | Becherucci | H02K 3/522 |
| | | | 310/207 |
| 2005/0061907 A1* | 3/2005 | Hashimoto | H02K 15/022 |
| | | | 242/443 |
| 2006/0169822 A1 | 8/2006 | Noji | |
| 2012/0292423 A1 | 11/2012 | Dunesme et al. | |

FOREIGN PATENT DOCUMENTS

| | | |
|---|---|---|
| JP | 2003-047215 A | 2/2003 |
| JP | 2004-336961 A | 11/2004 |
| JP | 2011-130554 A | 6/2011 |
| WO | WO 2011-004100 A2 | 1/2011 |

* cited by examiner

WINDING APPARATUS

TECHNICAL FIELD

The present invention relates to a winding apparatus and a winding method for winding a wire used to form a coil around a magnetic pole of a multi-pole armature.

BACKGROUND ART

A coil constituted by a wound wire is typically formed on a magnetic pole of a multi-pole armature. A conventional method of forming the coil uses an apparatus known as an inserter. In the method using the inserter, first, a coil having a predetermined shape is formed by winding the wire around a flyer or the like. Next, the coil is dropped between blades disposed below the flyer and inserted by an insertion jig into a slot formed in an inner peripheral surface of a stator. Further, using a shaping jig, the coil is housed securely in the slot, whereupon coil end portions projecting from respective axial direction ends of the stator are shaped. Finally, the coil is fixed by being tied using string or the like.

In the method described above, however, the steps required to perform winding are complicated, leading to a reduction in the productivity of the stator coil. Furthermore, when, in the method described above, the coil is inserted into the slot, the coil is likely to be damaged in particular by coming into contact with an edge portion of the stator. Hence, in the method described above, to avoid damaging the coil, the coil is inserted with a certain amount of leeway. However, when the coil expands such that a coil length becomes longer than necessary, an excessive amount of the coil projects from the end portions of the stator, leading to an increase in an axial direction length of the stator. Further, the excess part of the coil has no effect on the characteristics of the coil, leading to a reduction in the characteristics of a motor.

JP08-308188A discloses, as a method for solving these problems, a winding method for winding a wire around a slot by repeatedly performing the steps of: latching one end of a wire fed from a nozzle to a predetermined location and then causing the nozzle to project from a second end side of a stator between adjacent slots; hooking the wire fed from the nozzle onto a tip end of a hook on the second end side of the stator and then moving the hook with the wire hooked thereon around a periphery of the stator; separating the wire from the hook in a position straddling a predetermined number of slots, and then dropping the wire between adjacent slots; causing the nozzle to retreat to a first end side through between the slots into which the wire has been dropped; and moving the retreated nozzle around the periphery of the stator to return the nozzle to its original position.

SUMMARY OF INVENTION

In the winding method disclosed in JP08-308188A, both the hook and the nozzle are moved around the periphery of the stator with the wire hooked thereon, whereupon the wire is dropped between adjacent slots in a position straddling a predetermined number of slots. Hence, an operation for moving the hook and the nozzle until the wire is dropped takes a long time, and as a result, a winding speed cannot be increased sufficiently.

An object of the present invention is to provide a winding apparatus and a winding method with which a winding speed can be increased without damaging a wire.

According to one aspect of the present invention, a winding apparatus includes a nozzle that is provided on a first end side of a multi-pole armature and configured to feed a wire to a first end side of a magnetic pole in a winding position, a first latch pawl capable of latching the wire fed from the nozzle, a first latch pawl moving mechanism that is configured to move the first latch pawl from the first end side to a second end side of the multi-pole armature, and then move the first latch pawl moved to the second end side of the multi-pole armature in both a radial direction and a circumferential direction of the multi-pole armature, and a nozzle moving mechanism that is configured to move the nozzle in both the radial direction and the circumferential direction of the multi-pole armature. A width of the first latch pawl in the circumferential direction of the multi-pole armature is set at a width enabling insertion of the wire wound around and bent back by the first latch pawl into slots formed on both sides of one or more of the magnetic poles in the winding position.

DESCRIPTION OF EMBODIMENTS

An embodiment of the present invention will be described below with reference to the attached figures.

Figure 1:
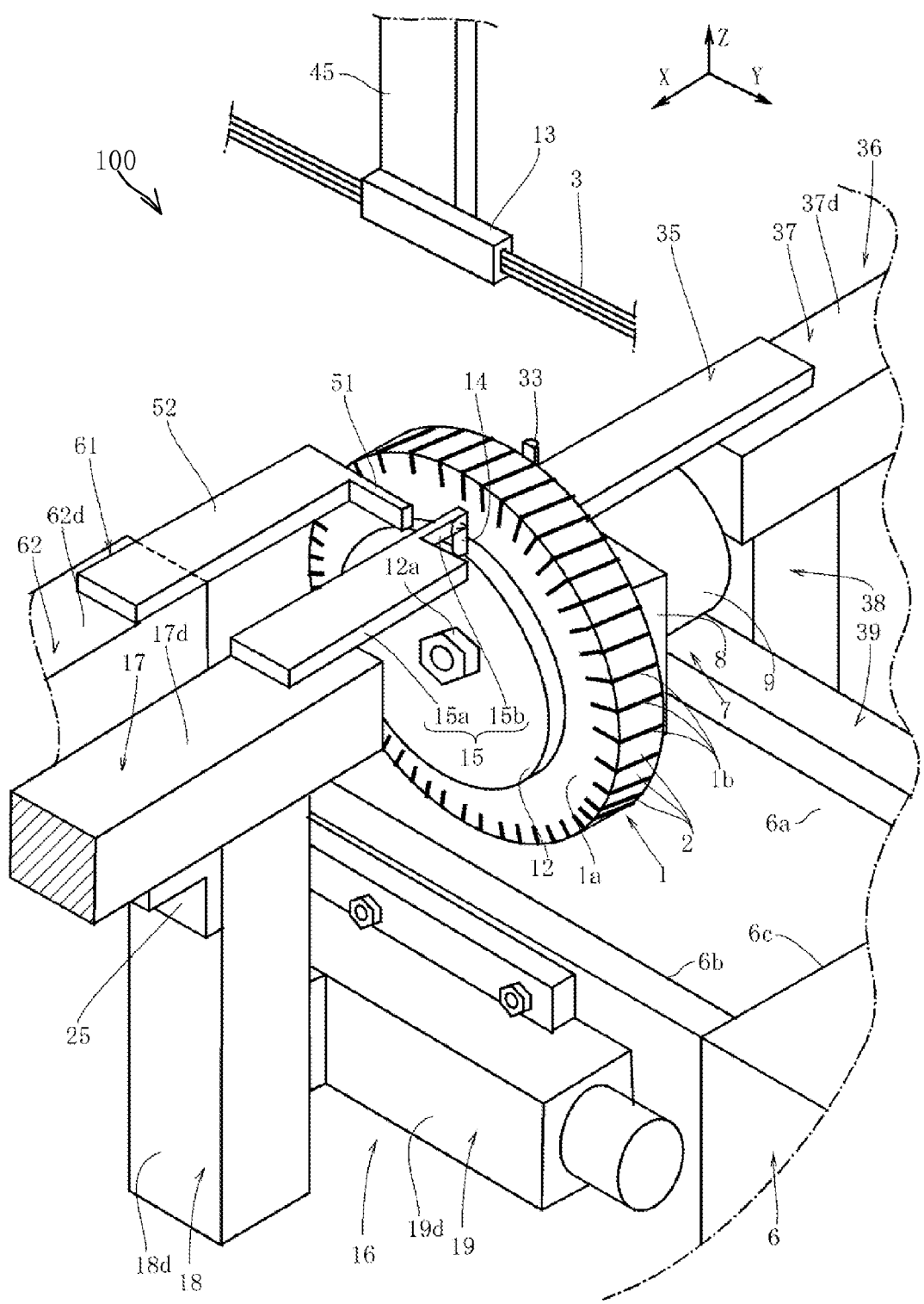
FIG. 1 is a perspective view of a winding apparatus according to an embodiment of the present invention.

FIGS. 1 to 4 illustrate a winding apparatus 100 according to this embodiment of the present invention. As illustrated in FIG. 1, the winding apparatus 100 is an apparatus that winds a wire 3 around a plurality of magnetic poles 2 of a multi-pole armature 1 forming a motor, a resolver, or a power generator. The multi-pole armature 1 is used in a resolver, and includes an annular portion 1a and the plurality of magnetic poles 2 projecting radially from the annular portion 1a toward a radial direction outer side. Straight slots 1b into which the wire 3 is inserted are provided as openings between the respective magnetic poles 2 of the multi-pole armature 1. The slots 1b are formed in a straight line shape parallel to a central axis of the annular portion 1a. In other words, each magnetic pole 2 is formed to have a rectangular cross-section, and an outer peripheral surface of the magnetic pole 2 is constituted by four smooth planes.

Figure 4:
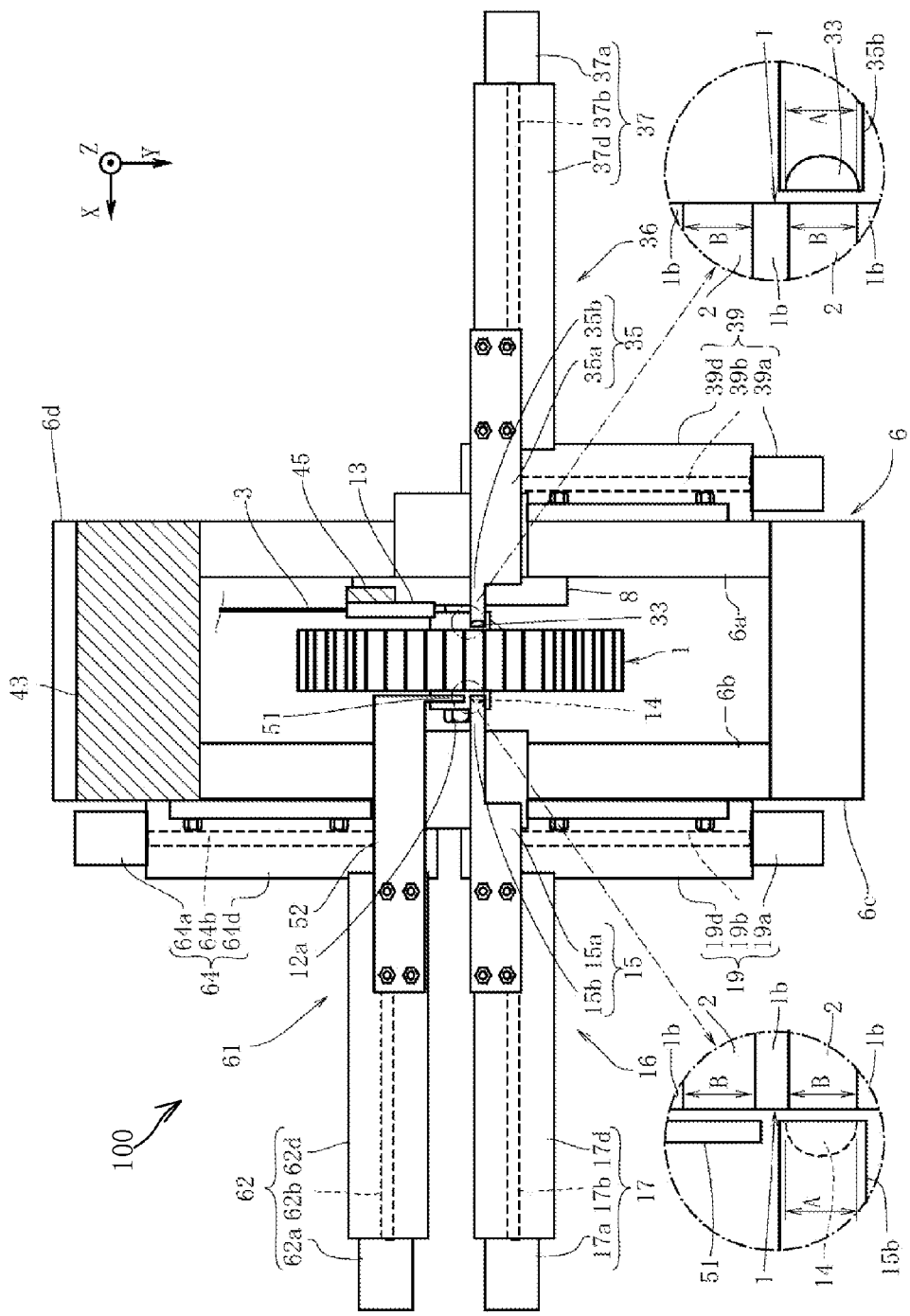
FIG. 4 is a sectional view taken along a B-B line in FIG. 2.

The winding apparatus 100 includes a base 5 on which respective members are disposed, a support base 6 formed in a rectangular shape and attached on the base 5, and an index mechanism 7 that is attached on the support base 6 and rotates the multi-pole armature 1 in order to send the respective magnetic poles 2 sequentially to a winding position. As illustrated in FIG. 4, the support base 6 includes a pair of side plates 6a, 6b provided at an interval so as to sandwich the multi-pole armature 1, and end plates 6c, 6d connected to end portions of the pair of side plates 6a, 6b to be formed in a rectangular shape with the end plates 6a, 6b.

Three mutually orthogonal axes, namely an X axis, a Y axis, and a Z axis, are set in the figures, and the configuration of the winding apparatus 100 will be described below using these axes. The X axis corresponds to a substantially horizontal lateral direction serving as an axial direction of the multi-pole armature 1. The Y axis corresponds to a substantially horizontal front-rear direction serving as a radial direction of the multi-pole armature 1. The Z axis corresponds to a radial direction of the multi-pole armature 1 extending in a vertical direction in a position of the magnetic pole 2 on which a winding is to be formed.

Figure 2:
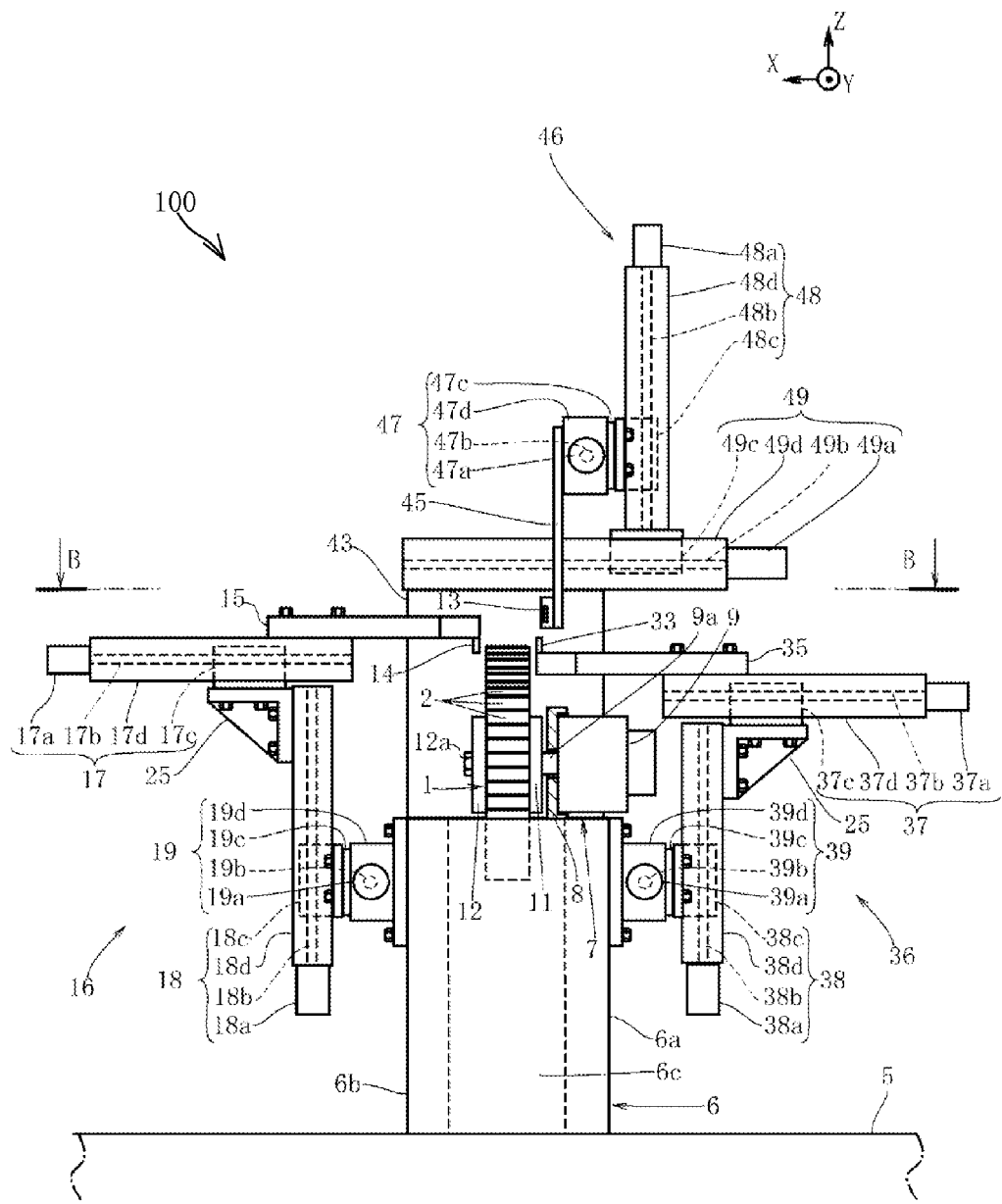
FIG. 2 is a front view of the winding apparatus according to this embodiment of the present invention.

As illustrated in FIG. 2, the index mechanism 7 supports the multi-pole armature 1 such that the axial direction of the multi-pole armature 1 extends horizontally. The index mechanism 7 includes an index motor 9 fixed to the support base 6 via an attachment plate 8, an index table 11 which is coupled to an output shaft 9a of the index motor 9 and to which the multi-pole armature 1 is attached, and an attachment tool 12 that is configured to be fixable to the index table 11 coaxially therewith, and that sandwiches the multi-pole armature 1 together with the index table 11. The annular portion 1a (see FIG. 1) of the multi-pole armature 1 is disposed coaxially with the index table 11. The multi-pole armature 1 thus disposed is sandwiched between the attachment tool 12 and the index table 11 via an attachment screw 12a so as to be supported coaxially with the horizontal output shaft 9a of the index motor 9.

In the index mechanism 7, the multi-pole armature 1 is supported coaxially with the horizontal output shaft 9a of the index motor 9, and therefore, when the index motor 9 is driven, the multi-pole armature 1 supported by the index table 11 rotates about the axis thereof. Here, the winding apparatus 100 performs winding around one magnetic pole 2 or a plurality of adjacent magnetic poles 2 positioned at the top of the multi-pole armature 1 in the Z axis direction, while the multi-pole armature 1 is supported such that the central axis thereof is horizontal. The one or more magnetic poles 2 positioned at the top of the multi-pole armature 1 and subjected to winding will be referred to hereafter as "the magnetic pole 2 in the winding position". When a winding operation onto the magnetic pole 2 in the winding position is complete, the multi-pole armature 1 is rotated by driving the index motor 9 to send the next magnetic pole 2 to be subjected to winding to the winding position at the top of the Z axis direction. Hence, the index mechanism 7 is configured to send the magnetic poles 2 of the multi-pole armature 1 sequentially to the winding position.

The winding apparatus 100 is used to insert the wire 3 simultaneously into the slots 1b on both sides of the one or more magnetic poles 2 in the winding position of the multi-pole armature 1. In this embodiment, a case in which the wire 3 is bent into a wave shape and inserted alternately into the respective slots 1b on both sides of a single magnetic pole 2 will be described.

The winding apparatus 100 includes a nozzle 13 provided on a first end side 1c of the multi-pole armature 1 to feed the wire 3 to the first end side 1c of the magnetic pole 2 in the winding position, a first latch pawl 14 capable of latching the wire 3 fed from the nozzle 13, a first latch pawl moving mechanism 16 that moves the first latch pawl 14 from the first end side 1c to a second end side 1d of the multi-pole armature 1 and then moves the first latch pawl 14 moved to the second end side 1d of the multi-pole armature 1 in both the radial direction and a circumferential direction of the multi-pole armature 1, and a nozzle moving mechanism 46 that moves the nozzle 13 in both the radial direction and the circumferential direction of the multi-pole armature 1.

An angular tube-shaped nozzle is used as the nozzle 13, and the nozzle 13 is configured such that a plurality of the wires 13 extending in the Y axis direction can be passed through the nozzle 13 while arranged in the Z axis direction.

In this embodiment, as described above, the wire 3 is bent into a wave shape and inserted alternately into the respective slots 1b. For this purpose, as illustrated in an enlarged view in FIG. 4, a width A of the first latch pawl 14 in the circumferential direction of the multi-pole armature 1 is set such that the wire 3 wound around and bent back by the first latch pawl 14 can be inserted into the two slots 1b, 1b of the one or more magnetic poles 2 in the winding position.

Figure 7:
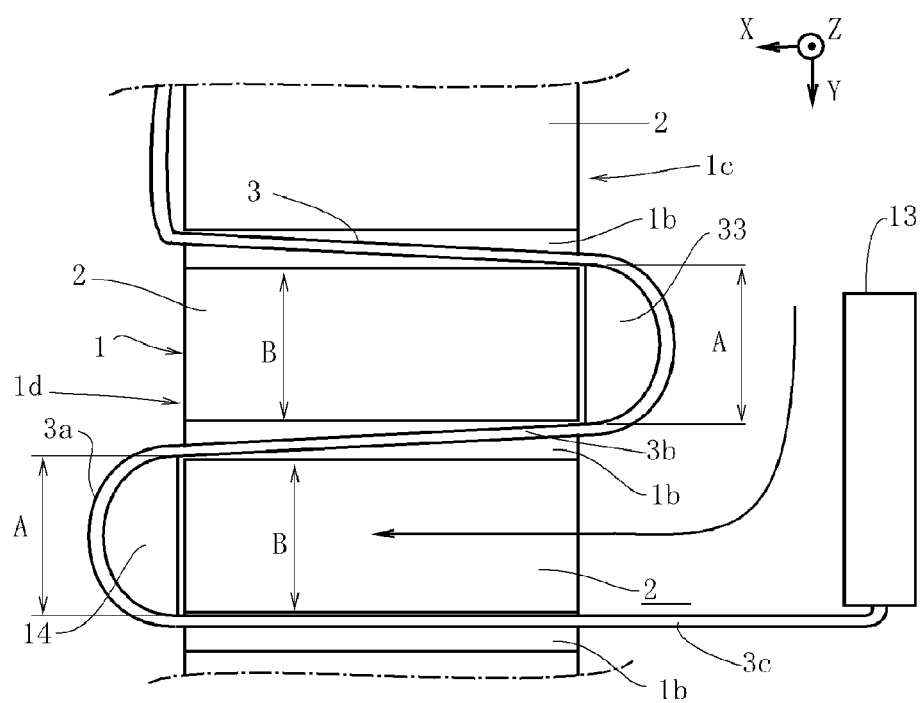
FIG. 7 is a top view illustrating a condition in which the wire is wound around a first latch pawl so as to be bent back.

The shape of the first latch pawl 14 according to this embodiment, in which the bent-back wire 3 is inserted into the slots 1b, 1b on both sides of the single magnetic pole 2, will now be described more specifically. As illustrated in FIG. 7, the width dimension A of the first latch pawl 14 in the Y axis direction when the first latch pawl 14 is positioned on the second end side 1d of the magnetic pole 2 in the winding position is set to be equal to or slightly larger than a circumferential direction width B of the magnetic pole 2. A surface of the first latch pawl 14 that faces the magnetic pole 2 is formed in planar form, and a surface thereof on an opposite side to the magnetic pole 2 is curved so as to bulge outward at the center in the X axis direction. Hence, the first latch pawl 14 is a rod-shaped member having a D-shaped cross-section.

Therefore, the width A of the first latch pawl 14 is set such that when the first latch pawl 14 is moved in the radial direction by the first latch pawl moving mechanism 16, to be described below, in a condition where the wire 3 is wound around and bent back by the first latch pawl 14, the bent-back wire 3 is inserted respectively into the slots 1b, 1b on both sides of the magnetic pole 2 in the winding position.

As illustrated in FIG. 2, the first latch pawl moving mechanism 16 is constituted by a combination of actuators 17, 19, and 18 that expand and contract in the X axis direction, the Y axis direction, and the Z axis direction, and is configured to move the first latch pawl 14 in the three axial directions.

The respective expanding/contracting actuators 17 to 19 of the first latch pawl moving mechanism 16 are constituted by elongated box-shaped housings 17d to 19d, ball screws 17b to 19b that are provided to extend through the interiors of the housings 17d to 19d in a lengthwise direction and driven to rotate by servo motors 17a to 19a, followers 17c to 19c that are screwed to the ball screws 17b to 19c so as to perform a parallel movement, and so on. The expanding/contracting actuators 17 to 19 are configured such that when the ball screws 17b to 19b are rotated by driving the servo motors 17a to 19a, the followers 17c to 19c screwed to the ball screws 17b to 19b can move in the lengthwise direction of the housings 17d to 19d.

The first latch pawl 14 is attached to the first latch pawl moving mechanism 16 via a first moving plate 15. More specifically, the first moving plate 15, on which the first latch pawl 14 is provided, is attached to the housing 17d of the X axis direction expanding/contracting actuator 17 to be capable of moving in the X axis direction. The follower 17c is attached to the housing 18d of the Z axis direction expanding/contracting actuator 18 via an L-shaped bracket 25 to be capable of moving the first moving plate 15 in the Z axis direction together with the X axis direction expanding/contracting actuator 17. Further, the follower 18c of the Z axis direction expanding/contracting actuator 18 is attached to the follower 19c of the Y axis direction expanding/contracting actuator 19 to be capable of moving the first moving plate 15 in the Y axis direction together with the X axis direction and Z axis direction expanding/contracting actuators 17, 18. The housing 19d of the Y axis direction expanding/contracting actuator 19 is attached to the side plate 6b of the support base 6. The X axis servo motor 17a, the Y axis servo motor 19a, and the Z axis servo motor 18a of the respective expanding/contracting actuators 17 to 19 are connected to a control output of a controller, not illustrated in the figures, that controls the servo motors.

As illustrated in FIGS. 1, 2, and 4, the winding apparatus 100 further includes a second latch pawl 33 provided on the first end side 1c of the multi-pole armature 1 to be capable of latching the wire 3 fed from the nozzle 13, and a second latch pawl moving mechanism 36 that moves the second latch pawl 33 in at least the radial direction of the multi-pole armature 1. The second latch pawl 33 is formed to have an identical sectional shape to the first latch pawl 14. In other words, as illustrated in FIG. 4, the second latch pawl 33 is also a rod-shaped member having a D-shaped cross-section. The width A of the second latch pawl 33 in the circumferential direction of the multi-pole armature 1 is set such that the wire 3 wound around and bent back by the second latch pawl 33 can be inserted into the slots 1b, 1b on both sides of the one or more magnetic poles 2 in the winding position. As illustrated in FIG. 7, in a case where the bent-back wire 3 is inserted into the slots 1b, 1b on both sides of a single magnetic pole 2, as in this embodiment, the Y axis direction width dimension A of the second latch pawl 33 in a condition where the magnetic pole 2 is sandwiched thereby is set to be equal to or slightly larger than the circumferential direction width B of the magnetic pole 2.

Hence, the width A of the second latch pawl 33 is set such that when the second latch pawl 33 is moved in the radial direction by the second latch pawl moving mechanism 36, to be described below, in a condition where the wire material 3 is wound around and bent back by the second latch pawl 33, the bent-back wire 3 is inserted respectively into the slots 1b, 1b on both sides of the magnetic pole 2 in the winding position.

As illustrated in FIGS. 1, 2, and 4, an identically structured mechanism to the first latch pawl moving mechanism 16 described above is used as the second latch pawl moving mechanism 36. In other words, the second latch pawl moving mechanism 36 is constituted by a combination of actuators 37 to 39 that expand and contract in the X axis direction, the Y axis direction, and the Z axis direction, and is configured to move the second latch pawl 33 in the three axial directions. The second latch pawl 33 is attached to a housing 37d of the X axis direction expanding/contracting actuator 37 of the second latch pawl moving mechanism 36 via a second moving plate 35. Since the second latch pawl moving mechanism 36 is structured identically to the first latch pawl moving mechanism 16 described above and provided symmetrically thereto, repeated description thereof has been omitted. The first latch pawl moving mechanism 16 and the second latch pawl moving mechanism 36 are thus configured to be capable of moving the first latch pawl 14 and the second latch pawl 33 as desired in the three axial directions relative to the base 5 together with the first moving plate 15 and the second moving plate 35 in response to a command from the controller, not illustrated in the figures.

As illustrated in FIG. 4, the first moving plate 15 to which the first latch pawl 14 is attached and the second moving plate 35 to which the second latch pawl 33 is attached respectively include main body plates 15a, 35a, base ends of which are attached to the housings 17d, 37d of the X axis direction expanding/contracting actuators 17, 37 of the respective moving mechanisms 16, 36. Extension portions 15b, 35b extending in the X axis direction toward the multi-pole armature 1 are formed on respective tip ends of the main body plates 15a, 35a. The first latch pawl 14 is attached to a tip end of the extension portion 15b so as to be oriented downward in the Z axis direction. The second latch pawl 33 is attached to a tip end of the extension portion 35b so as to be oriented upward in the Z axis direction.

Figure 3:
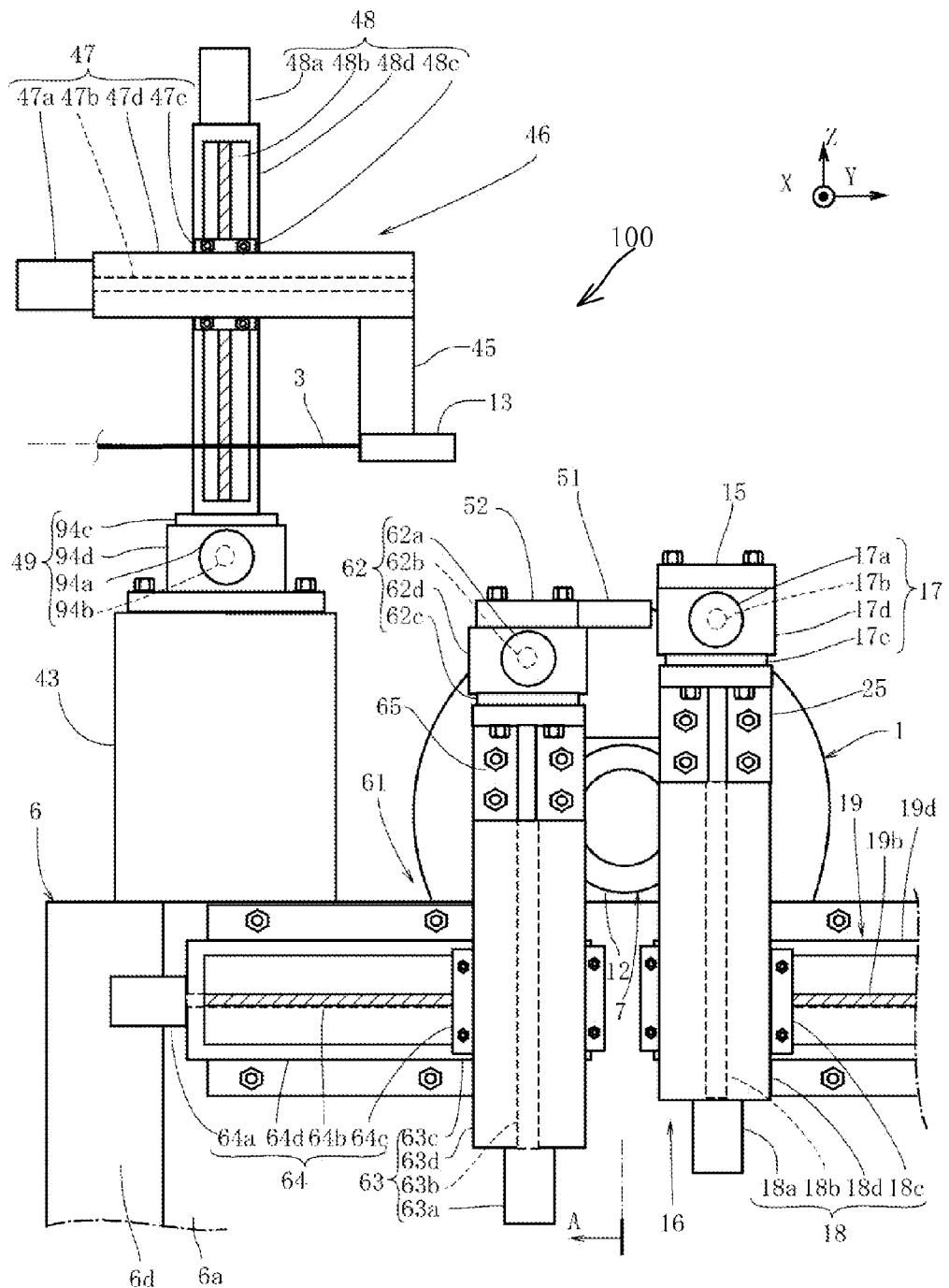
FIG. 3 is a left side view of the winding apparatus according to this embodiment of the present invention.

As illustrated in FIGS. 1 to 3, the winding apparatus 100 includes the nozzle moving mechanism 46 that moves the nozzle 13 in at least both the radial direction and the circumferential direction of the multi-pole armature 1. The nozzle moving mechanism 46 also is structured identically to the respective moving mechanisms 16, 36 described above, i.e. constituted by a combination of actuators 47 to 49 that expand and contract in the X axis direction, the Y axis direction, and the Z axis direction. More specifically, a vertical plate 45 on which the nozzle 13 is provided is attached to a housing 47d of the Y axis direction expanding/contracting actuator 47 to be capable of moving in the Y axis direction. Further, a follower 47c is attached to a follower 48c of the Z axis direction expanding/contracting actuator 48 to be capable of moving the vertical plate 45 in the Z axis direction together with the Y axis direction expanding/contracting actuator 47.

A housing 48d of the Z axis direction expanding/contracting actuator 48 is attached to a follower 49c of the X axis direction expanding/contracting actuator 49. A housing 49d of the X axis direction expanding/contracting actuator 49 is attached to the support base 6 via a pedestal 43 to be capable of moving the vertical plate 45 in the X axis direction together with the Y axis direction and Z axis direction expanding/contracting actuators 47, 48. A Z axis servo motor 48a, a Y axis servo motor 47a, and an X axis servo motor 49a of the respective expanding/contracting actuators 47 to 49 are connected to the control output of the controller, not illustrated in the figures, that controls the servo motors. The nozzle moving mechanism 46 is configured to be capable of moving the nozzle 13 as desired in the three axial directions relative to the base 5 together with the vertical plate 45 by driving the respective expanding/contracting actuators 47 to 49 in response to a command from the controller.

Figure 13:
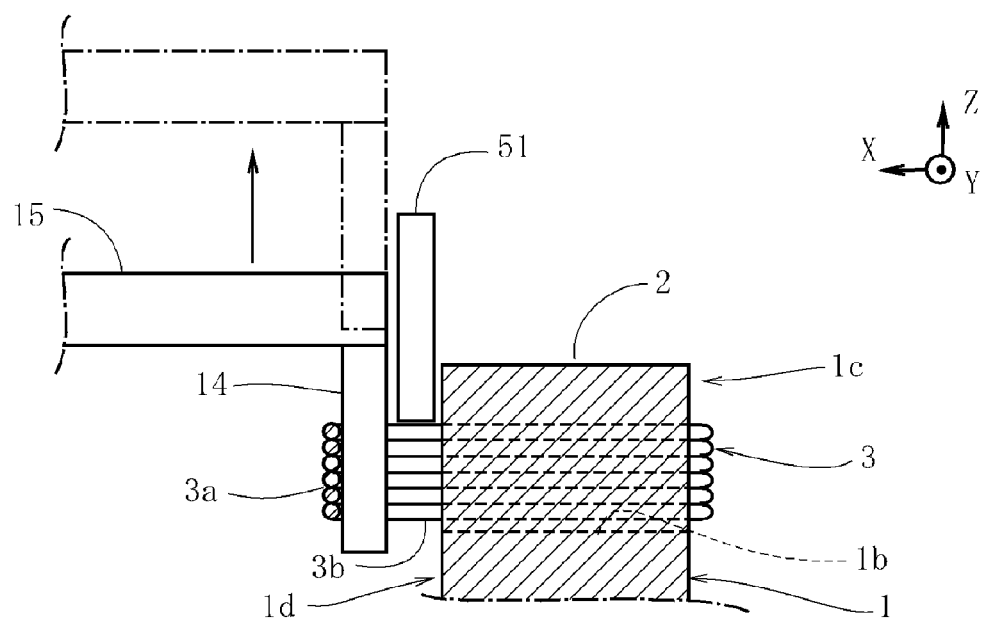
FIG. 13 is a sectional view illustrating a condition in which the first latch pawl is withdrawn from the wire inserted into the slot.

The winding apparatus 100 includes a shutter member 51 and a member moving mechanism 61 for moving the shutter member 51. As illustrated in FIG. 13, the shutter member 51 is used to restrain the wire 3 inserted into the slots 1b, 1b on both sides of the one or more magnetic poles 2 in the winding position between the multi-pole armature 1 and the first latch pawl 14 on the second end side 1d of the multi-pole armature 1. The shutter member 51 is constituted by a plate member that can be inserted between the multi-pole armature 1 and the first latch pawl 14. The member moving mechanism 61 moves the shutter member 51 between a restraining position for restraining the wire 3 and a removed position removed from the restraining position. The member moving mechanism 61 is configured to be capable of moving the shutter member 51 via a third moving plate 52. More specifically, the member moving mechanism 61 is structured identically to the various moving mechanisms 16, 36, 46 described above, i.e. the member moving mechanism 61 is constituted by a combination of actuators 62 to 64 that expand and contract in the X axis direction, the Y axis direction, and the Z axis direction.

The member moving mechanism 61 is attached to a housing 62d of the X axis direction expanding/contracting actuator 62 to be capable of moving the third moving plate 52, on which the shutter member 51 is provided, in the X axis direction. The third moving plate 52 is attached to the housing 62d so as to extend in the X axis direction. The shutter member 51 is provided to extend in the Y axis direction from a tip end of the third moving plate 52. In other words, the third moving plate 52 and the shutter member 51 together form an L shape. In the member moving mechanism 61 to which the third moving plate 52 is thus attached, a follower 62c is attached to a housing 63d of the Z axis direction expanding/contracting actuator 63 via an L-shaped bracket 65 to be capable of moving the third moving plate 52 in the Y axis direction together with the X axis direction expanding/contracting actuator 62. A follower 63c of the Z axis direction expanding/contracting actuator 63 is attached to a follower 64c of the Y axis direction expanding/contracting actuator 64. A housing 64d of the Y axis direction expanding/contracting actuator 64 is attached to the support base 6 to be capable of moving the third moving plate 52 in the Y axis direction together with the X axis direction and Z axis direction expanding/contracting actuators 62, 63.

The X axis servo motor 62a, the Z axis servo motor 63a, and the Y axis servo motor 64a of the respective expanding/contracting actuators 62 to 64 are connected to the control output of the controller, not illustrated in the figures, that controls the servo motors. The member moving mechanism 61 moves the shutter member 51 as desired in the three axial directions relative to the base 5 together with the third moving plate 52 by driving the respective expanding/contracting actuators 62 to 64 in response to a command from the controller. Hence, the member moving mechanism 61 is configured to be capable of moving the shutter member 51 between the restraining position for restraining the wire 3 and the removed position removed from the restraining position.

Next, a winding method according to the present invention, employing the above winding apparatus, will be described.

In the winding method according to this embodiment, a wire bending back step of bending back the wire 3 fed to the first end side 1c of the magnetic pole 2 in the winding position guiding the wire 3 from the first end side 1c to the second end side 1d of the multi-pole armature 1, and an insertion step of inserting the bent-back wire 3 into the slots 1b, 1b on both sides of the one or more magnetic poles 2 in the winding position by moving the wire 3 in the radial direction of the multi-pole armature 1, are performed repeatedly. Further, an index step of sending one or more new magnetic poles 2 to the winding position by rotating the multi-pole armature 1, is provided between the insertion step and the wire bending back step. Each step will be described below in detail, and it is assumed that operations of the winding apparatus 100 during the respective steps are controlled automatically by the controller, not illustrated in the figures, which is installed in the winding apparatus 100.

First, as preparation before performing winding, the multi-pole armature 1 is supported by the index mechanism 7. More specifically, as illustrated in FIGS. 1 and 2, the multi-pole armature 1 is sandwiched between the attachment tool 12 and the index table 11 by disposing the annular portion 1a of the multi-pole armature 1 coaxially with the index table 11 and attaching the attachment tool 12 to the index table 11 via the attachment screw 12a. As a result, the multi-pole armature 1 is supported by the horizontal output shaft 9a of the index motor 9 coaxially therewith.

Next, the index step is performed. In the index step, the supported multi-pole armature 1 is rotated by driving the index motor 9 of the index mechanism 7, whereby the magnetic pole 2 to be subjected to winding is moved to the winding position at the top of the Z axis direction. It is assumed that in the index step, the multi-pole armature 1 is rotated in a direction indicated by a dot-dash line arrow in FIG. 5. Although not illustrated in the figures, positions of the magnetic poles 2 are detected using a detector such as a sensor provided in the vicinity of the magnetic poles 2, and the magnetic poles 2 are positioned in the winding position of the multi-pole armature 1 on the basis of detected information. When winding is started, the nozzle 13 is moved by the nozzle moving mechanism 46 such that the nozzle 13 supplying the wire 3 is caused to revolve around a tying pin, not illustrated in the figures, of the multi-pole armature 1. As a result, the wire 3 fed from the nozzle 13 is tied to the tying pin. From this condition, the wire bending back step, the insertion step, and the index step are executed repeatedly in succession. FIGS. 5 to 15 illustrate midway conditions.

Figure 5:
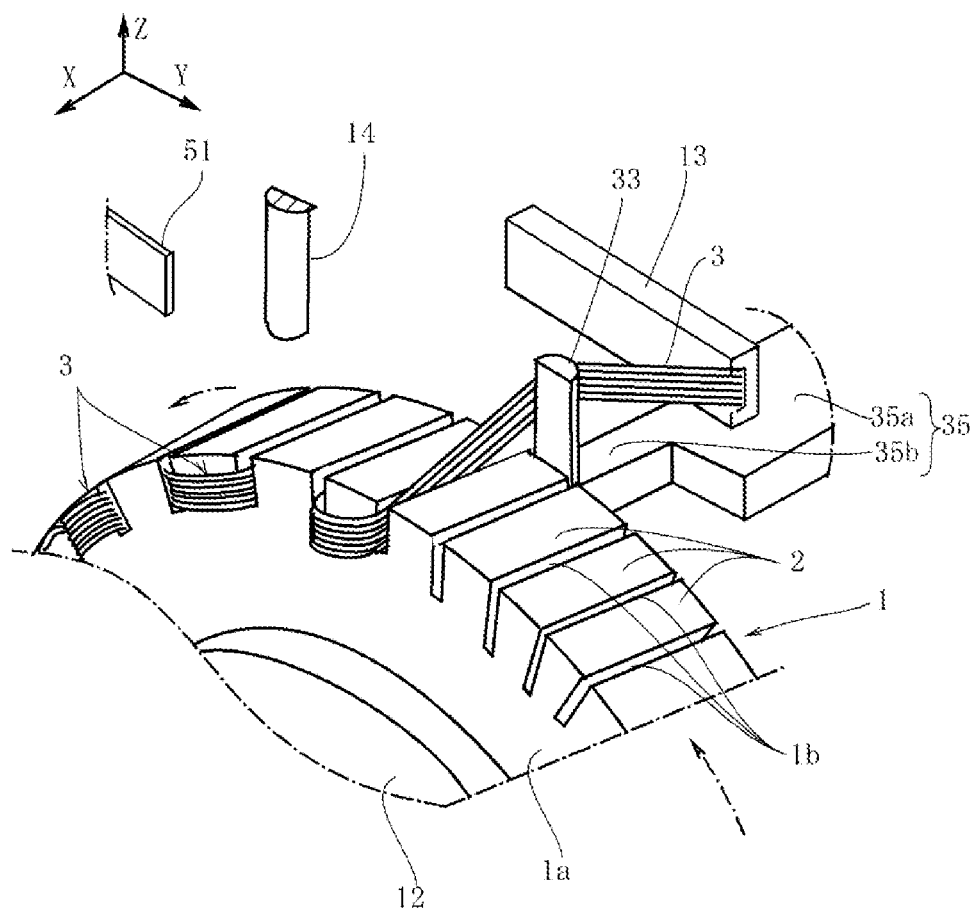
FIG. 5 is a perspective view illustrating a condition in which a wire is latched to a second latch pawl.
Figure 6:
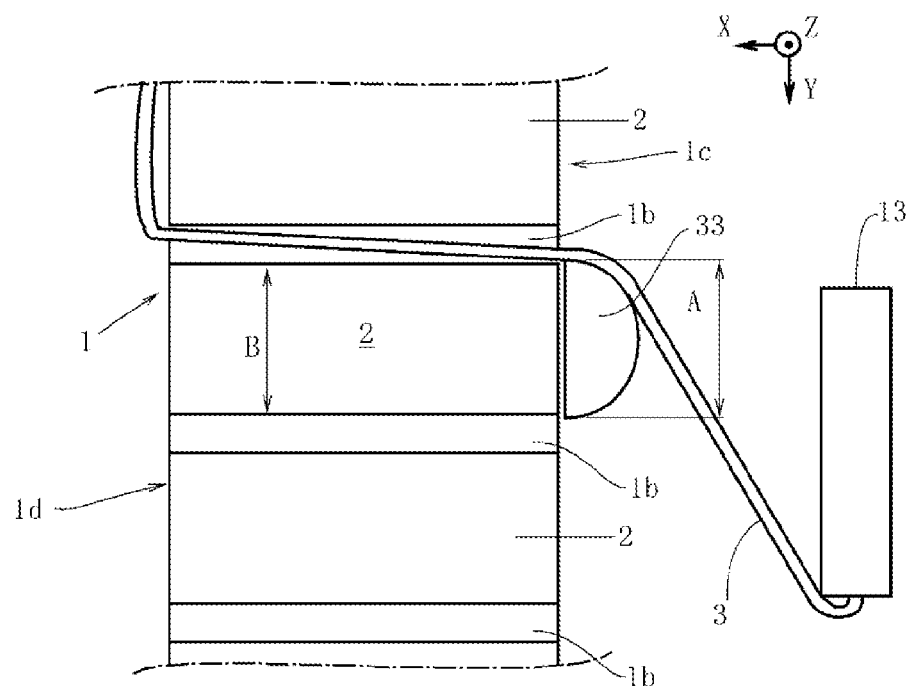
FIG. 6 is a top view illustrating the condition in which the wire is latched to the second latch pawl.

In the wire bending back step, as illustrated in FIGS. 5 and 6, the second latch pawl 33 is moved by the second latch pawl moving mechanism 36 such that the second latch pawl 33 is disposed on the first end side 1c of the magnetic pole 2 in the winding position at a slight gap relative thereto in the axial direction of the multi-pole armature 1. The second latch pawl 33 is then moved to the outer side of the multi-pole armature 1, or in other words upward in the Z axis direction, by the second latch pawl moving mechanism 36. Next, the nozzle 13 is moved by the nozzle moving mechanism 46 such that the wire 3 inserted previously into the slot 1b (at the start of winding, the wire 3 tied to the tying pin, not illustrated in the figures) catches on the second latch pawl 33. The nozzle 13 is thus disposed on the first end side 1c of the multi-pole armature 1 at a predetermined interval in the X axis direction relative to the second latch pawl 33.

Figure 8:
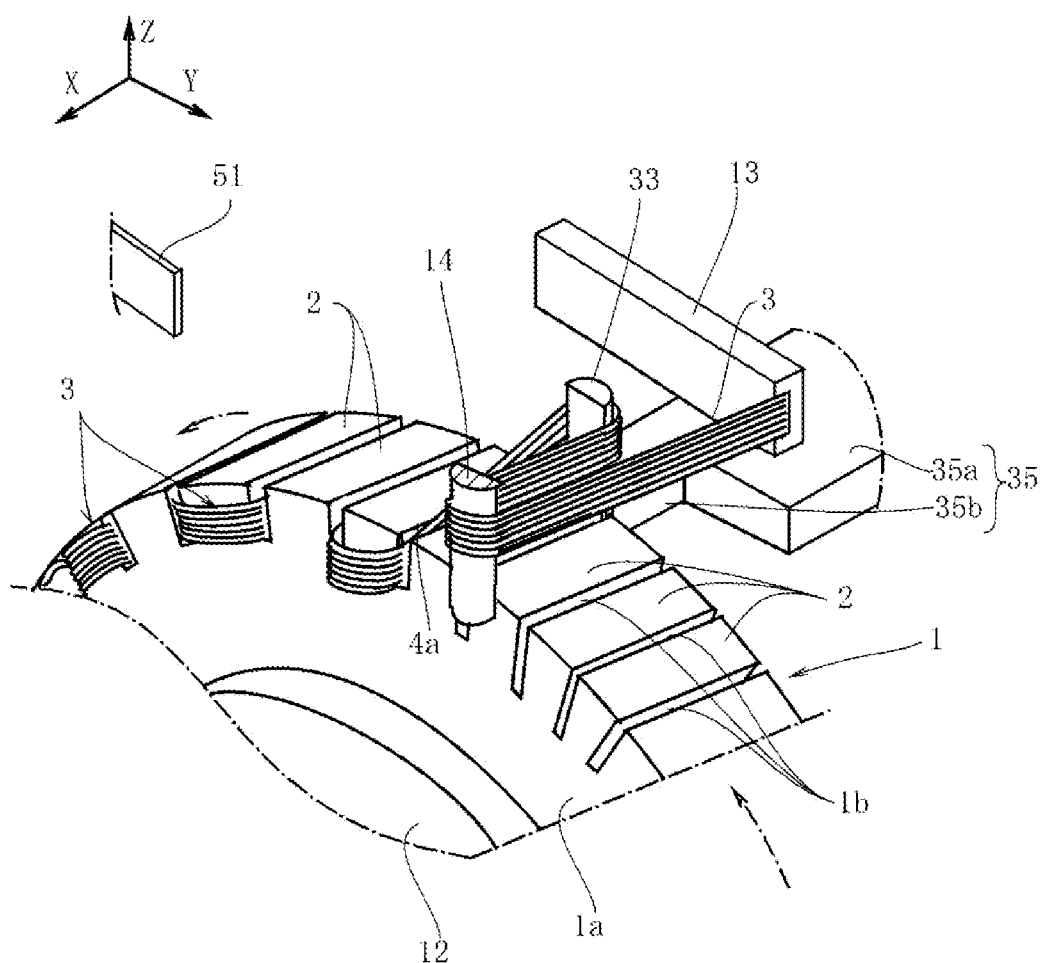
FIG. 8 is a perspective view illustrating the condition in which the wire is wound around the first latch pawl so as to be bent back.

Next, as illustrated by a solid line arrow in FIG. 7, the first latch pawl 14 is moved by the first latch pawl moving mechanism 16 such that the wire 3 fed to the first end side 1c of the magnetic pole 2 in the winding position and positioned between the second latch pawl 33 and the nozzle 13 catches on the first latch pawl 14. The first latch pawl 14 is then moved further from the first end side 1c to the second end side 1d of the multi-pole armature 1. As a result, the wire 3 newly fed from the nozzle 13 positioned on the first end side 1c of the magnetic pole 2 in the winding position is guided from the first end side 1c to the second end side 1d of the multi-pole armature 1 and thereby bent back. After bending back the wire 3, as illustrated in FIG. 8, the first latch pawl 14 is disposed at the top of the Z axis direction in the vicinity of the second end side 1d of the magnetic pole 2 to which the first latch pawl 14 is adjacent.

As illustrated in FIG. 7, when the wire 3 is wound around and bent back by the first latch pawl 14 in this manner, the bent-back wire 3 is constituted by a semicircular arc portion 3a wound around the first latch pawl 14, a first extending portion 3b connected to a first end portion of the arc portion 3a so as to extend to the second latch pawl 33, and a second extending portion 3c extending from a second end portion of the arc portion 3a to the nozzle 13. As illustrated in FIG. 7, the Y axis direction width dimension A of the second latch pawl 33 positioned at one end of the magnetic pole 2 is set to be equal to or slightly larger than the circumferential direction width B of the magnetic pole 2. Accordingly, the first extending portion 3b extending between the second latch pawl 33 and the first latch pawl 14 is positioned above the slot 1b between the magnetic pole 2 to which the second latch pawl 33 is adjacent and the magnetic pole 2 to which the first latch pawl 14 is adjacent.

Next, the nozzle 13 is moved again by the nozzle moving mechanism 46 such that the second extending portion 3c extending from the arc portion 3a to the nozzle 13 is parallel to the slot 1b opposing the second end portion of the arc portion 3a. As illustrated in FIG. 7, the Y axis direction width dimension A of the first latch pawl 14 positioned at the other end of the magnetic pole 2 is set to be equal to or slightly larger than the circumferential direction width B of the magnetic pole 2. Accordingly, the second extending portion 3c extending from the arc portion 3a toward the nozzle 13 is positioned above the slot 1b that sandwiches the magnetic pole 2 to which the first latch pawl 14 is adjacent together with the slot 1b above which the first extending portion 3b is positioned.

Figure 9:
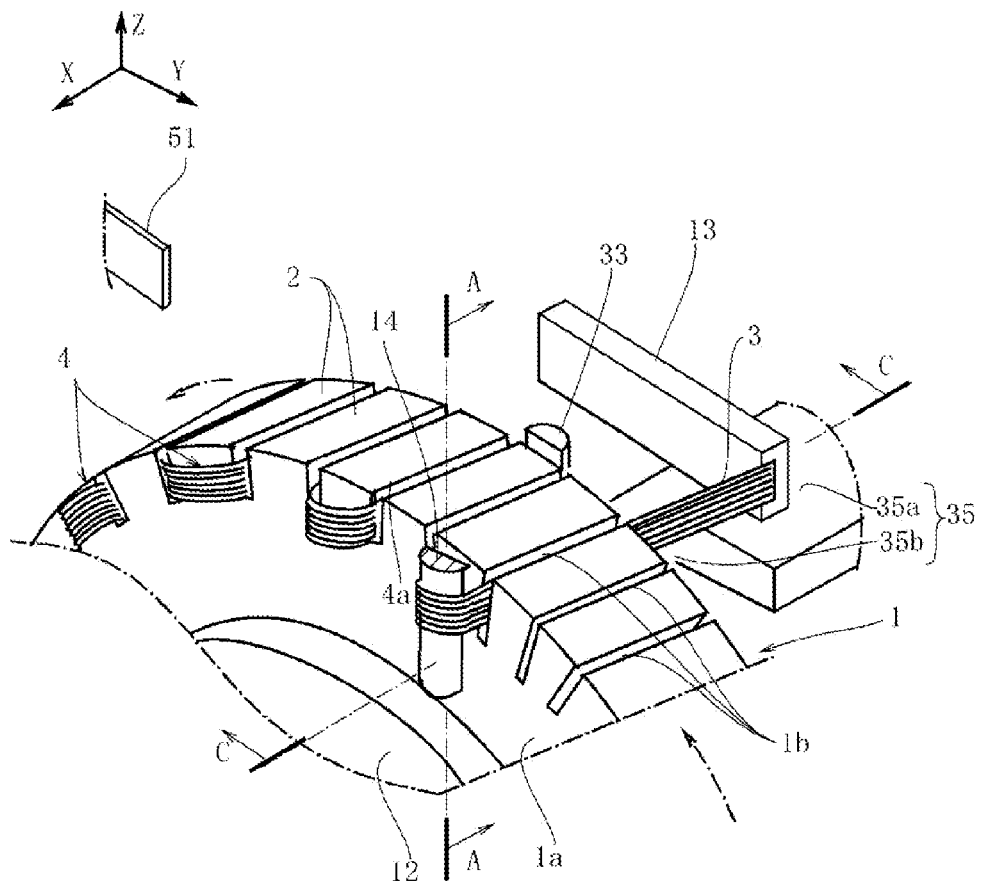
FIG. 9 is a perspective view illustrating a condition in which the bent-back wire is inserted into slots on both sides of a magnetic pole.

Next, the insertion step is performed. In the insertion step, the bent-back wire 3 is moved in the radial direction of the multi-pole armature 1 so as to be inserted into the slots 1b, 1b on both sides of the one or more magnetic poles 2 in the winding position. More specifically, as illustrated in FIG. 9, the first and second latch pawls 14, 33 and the nozzle 13 are moved downward in the Z axis direction such that the wire 3 positioned between the second latch pawl 33 and the nozzle 13 and bent back by the first latch pawl 14 is inserted into the slots 1b, 1b on both sides of the magnetic pole 2 in the winding position. The first and second latch pawls 14, 33 are moved respectively by the first and second latch pawl moving mechanisms 16, 36 (see FIG. 2), while the nozzle 13 is moved by the nozzle moving mechanism 46. In other words, the first and second latch pawl moving mechanisms 16, 36 are capable of moving in the Z direction, i.e. the radial direction of the multi-pole armature 1, such that the wire 3 wound around and bent back by the first and second latch pawls 14, 33 is inserted into the respective slots 1b, 1b on both sides of the magnetic pole 2 in the winding position.

Figure 10:
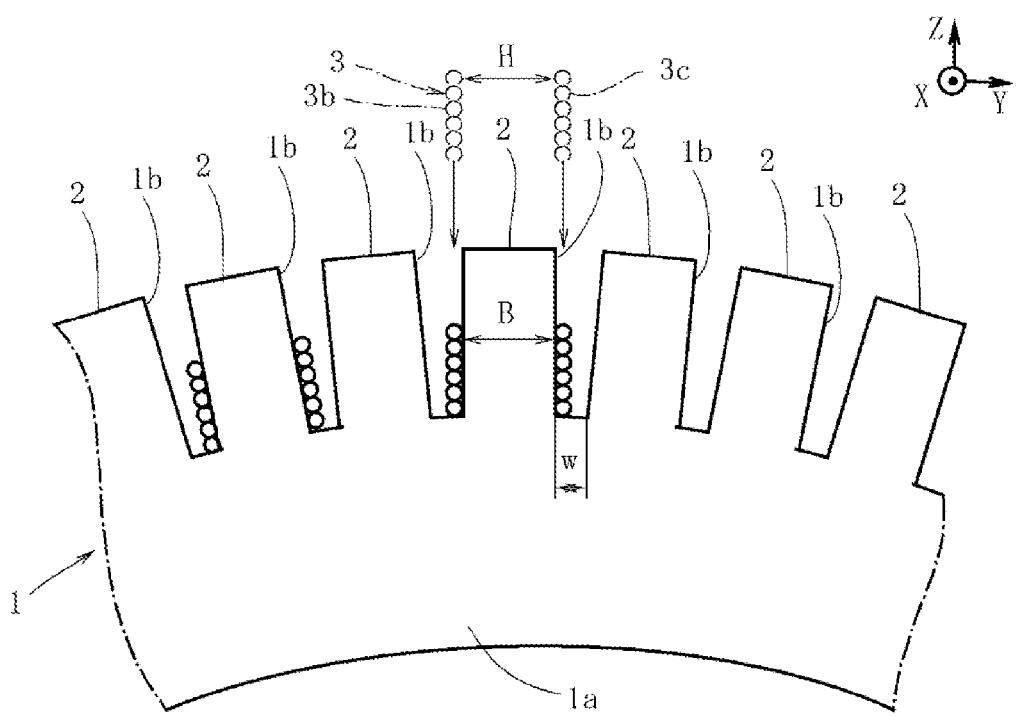
FIG. 10 is a sectional view taken along an A-A line in FIG. 9, illustrating a condition in which the wire wound around the first latch pawl is inserted into a slot.

To describe this in more detail, the respective widths of the first and second latch pawls 14, 33 are set such that the wire 3 wound around and bent back by the first and second latch pawls 14, 33 is inserted into the respective slots 1b, 1b on both sides of the magnetic pole 2 in the winding position. In other words, during the insertion step, the first extending portion 3b extending from the first latch pawl 14 to the second latch pawl 33 is positioned above one of the slots 1b sandwiching the magnetic pole 2 in the winding position, while the second extending portion 3c extending from the first latch pawl 14 to the nozzle 13 is positioned above the other slot 1b sandwiching the magnetic pole 2 in the winding position. As illustrated in FIG. 10, an interval H between the respective extending portions 3b, 3c is set to be at least as wide as the circumferential direction width B of the magnetic pole 2. Therefore, by moving the first and second latch pawls 14, 33 in the radial direction of the multi-pole armature 1, as illustrated by a solid line arrow in FIG. 10, the extending portions 3b, 3c can be inserted into the respective slots 1b, 1b on both sides of the magnetic pole 2 in the winding position. As a result, the wire 3 can be inserted into the slots 1b, 1b on both sides of the magnetic pole 2 in the winding position without deforming.

Further, the interval between the extending portions 3b, 3c of the bent-back wire 3 is set to be at least as wide as the circumferential direction width B of the magnetic pole 2. The extending portions 3b, 3c are moved in the radial direction of the multi-pole armature 1 in this condition, and thus inserted into the slots 1b. As a result, the wire 3 does not scrape against the slots 1b and the magnetic pole 2 excessively. Moreover, the wire 3 is not damaged. Furthermore, in this embodiment, the nozzle 13 feeds a plurality of the wires 3 arranged side by side in the Z axis direction. Hence, even when a width W (see FIG. 10) of the slot 1b into which the wire 3 is inserted is narrow, the plurality of wires 3 can be inserted during the insertion step without overlapping each other in the width direction of the slot 1b.

Figure 11:
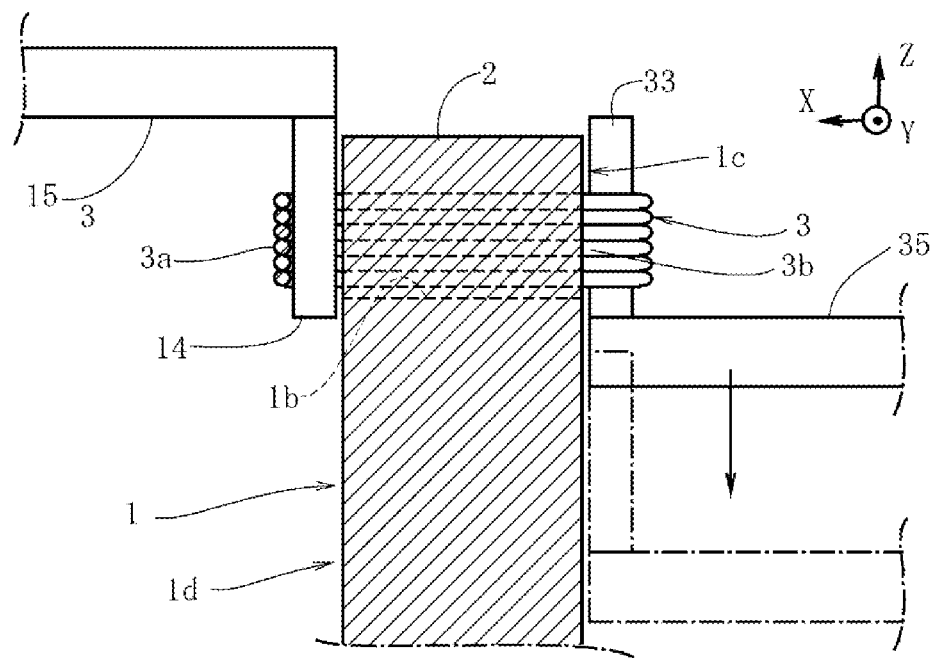
FIG. 11 is a sectional view taken along a C-C line in FIG. 9, illustrating a condition in which the second latch pawl is withdrawn from the wire inserted into the slot.

Next, as illustrated in FIG. 11, the second latch pawl 33 is withdrawn from the wire 3 wound around the second latch pawl 33. The second latch pawl 33 is provided to project upward from the second moving plate 35. Therefore, as illustrated by a solid line arrow in FIG. 11, the second latch pawl 33 is withdrawn by having the second latch pawl moving mechanism 36 (see FIG. 2) move the second latch pawl 33 downward in the Z axis direction, i.e. in a center direction of the multi-pole armature 1. Here, the wire 3 wound around the second latch pawl 33 is inserted into the slot 1b, and therefore the wire 3 does not move further downward in the Z axis direction, i.e. in the center direction of the multi-pole armature 1. By moving the second latch pawl 33 downward in this manner, the second latch pawl 33 can be withdrawn from the wound wire 3.

Figure 12:
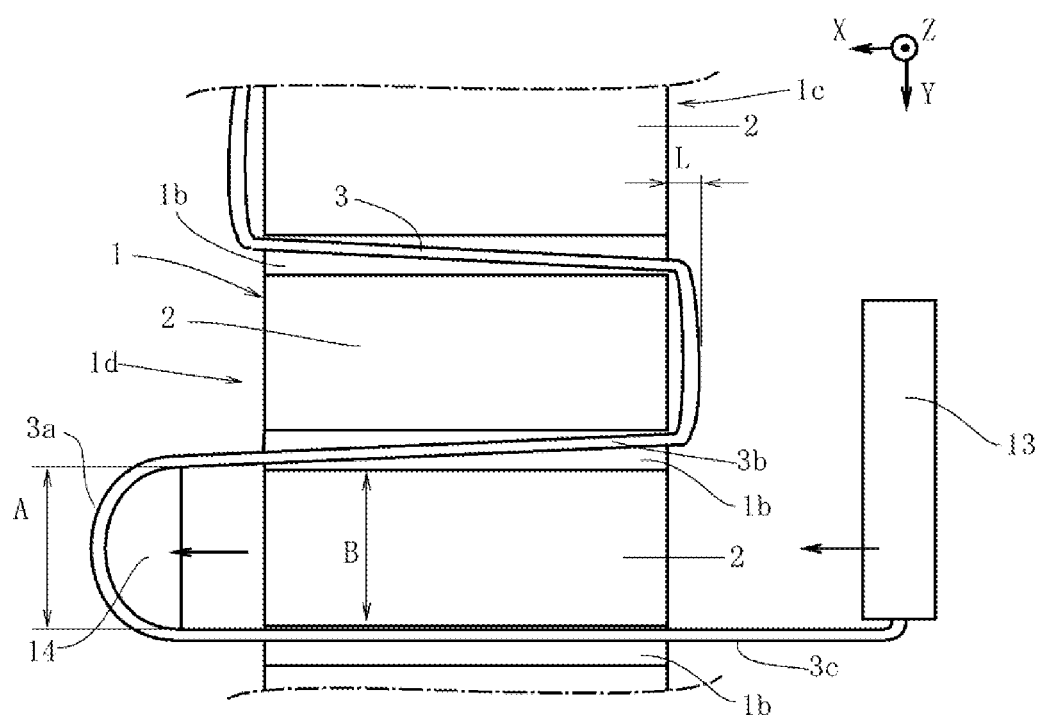
FIG. 12 is a top view illustrating a condition in which the first latch pawl and a nozzle are moved in order to reduce a projection amount by which the wire projects from a first end side of a multi-pole armature.

After the second latch pawl 33 is withdrawn from the wire 3, the wire 3 projects in an arc shape from the first end side 1c of the multi-pole armature 1. Next, therefore, as illustrated in FIG. 12, both the first latch pawl 14 and the nozzle 13 are moved slightly to the second end side 1d of the multi-pole armature 1, or in other words in the X axis direction, such that the wire 3 projecting in an arc shape from the first end side 1c of the multi-pole armature 1 is pulled into the slot 1b. As a result, a projection amount L by which the wire 3 projects from the first end side 1c of the multi-pole armature 1 is reduced. The first latch pawl 14 is moved by the first latch pawl moving mechanism 16 (see FIGS. 2 and 3), and the nozzle 13 is moved by the nozzle moving mechanism 46 (see FIGS. 2 and 3).

Next, as illustrated in FIG. 13, the first latch pawl 14 is withdrawn from the wire 3 wound around the first latch pawl 14. The first latch pawl 14 is provided to project downward from the first moving plate 15. Therefore, as illustrated by a solid line arrow in FIG. 13, the first latch pawl 14 is withdrawn by having the first latch pawl moving mechanism 16 (see FIGS. 2 and 3) move the first latch pawl 14 upward in the Z axis direction, i.e. toward the radial direction outer side of the multi-pole armature 1. Further, the wire 3 wound around the first latch pawl 14 is inserted into the slot 1b from above. Therefore, to prevent the wire 3 from moving upward together with the first latch pawl 14, the wire 3 between the second end side 1d of the multi-pole armature 1 and the first latch pawl 14 is restrained from above by the shutter member 51. During the index step and the wire bending back step described above, the shutter member 51 is held at a remove from the position for restraining the wire 3 so as not to obstruct the index step and the wire bending back step. After withdrawing the first latch pawl 14, the shutter member 51 is moved to the restraining position for restraining the wire 3 by the member moving mechanism 61 (see FIGS. 2 and 3).

Figure 14:
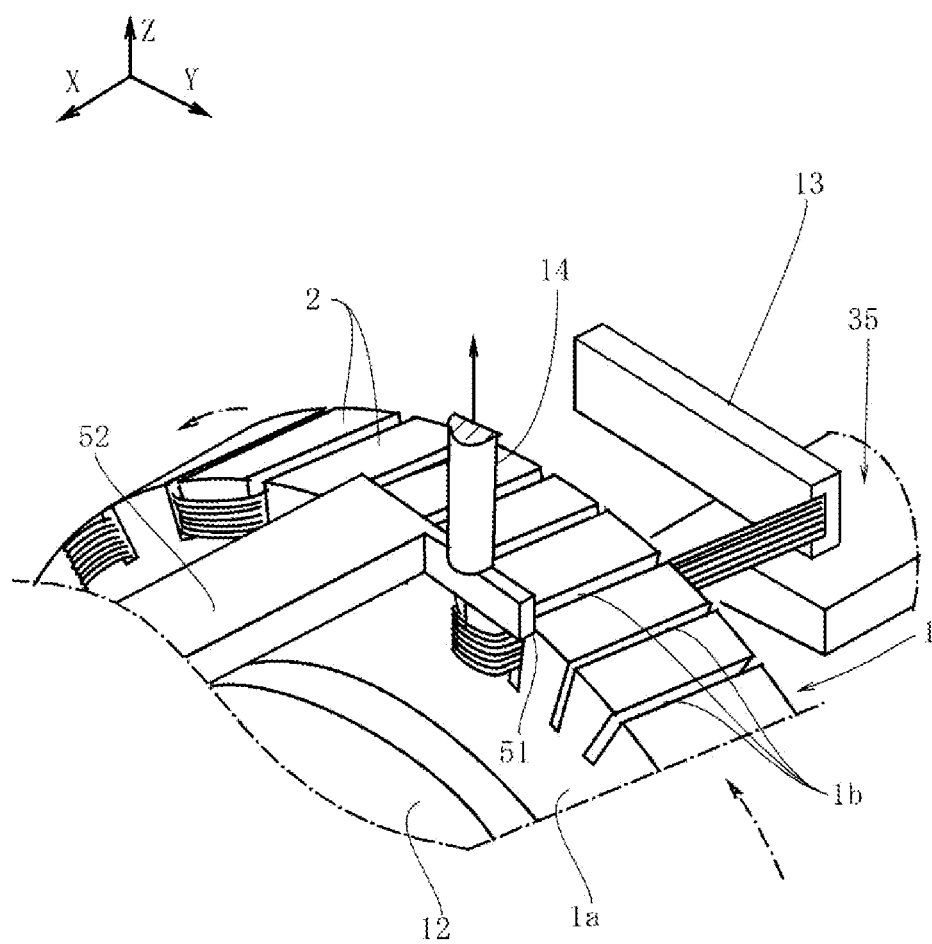
FIG. 14 is a perspective view illustrating the condition in which the first latch pawl is withdrawn from the wire inserted into the slot.

As illustrated in FIG. 14, when the first latch pawl 14 is moved upward in the Z axis direction, i.e. toward the outer side of the multi-pole armature 1, while the wire 3 between the second end side 1d of the multi-pole armature 1 and the first latch pawl 14 is restrained by the shutter member 51, the wound wire 3 is prevented from moving upward by the shutter member 51, and therefore only the first latch pawl 14 moves upward. As a result, the first latch pawl 14 can be withdrawn from the wire 3 wound around the first latch pawl 14. After withdrawing the first latch pawl 14, the shutter member 51 is moved back to the removed position removed from the restraining position for restraining the wire 3 by the member moving mechanism 61 (see FIGS. 2 and 3) and held in the removed position.

Figure 15:
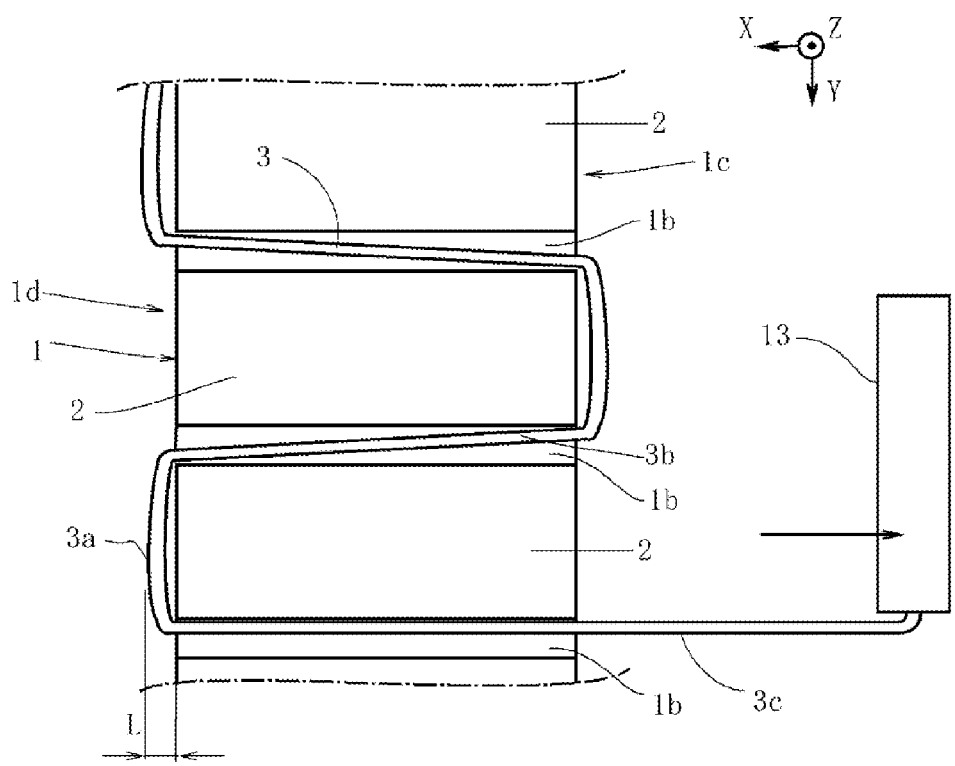
FIG. 15 is a top view illustrating a condition in which the nozzle is moved in order to reduce a projection amount by which the wire projects from a second end side of the multi-pole armature.

After the first latch pawl 14 is withdrawn from the wire 3, the wire 3 projects in an arc shape from the second end side 1d of the multi-pole armature 1. Next, therefore, as illustrated in FIG. 15, the nozzle 13 is moved slightly to the first end side 1c of the multi-pole armature 1, or in other words in the X axis direction, such that the wire 3 projecting in an arc shape from the second end side 1d of the multi-pole armature 1 is pulled into the slot 1b. As a result, the projection amount L by which the wire 3 projects from the second end side 1d of the multi-pole armature 1 is reduced. The nozzle 13 is moved by the nozzle moving mechanism 46 (see FIGS. 2 and 3). Next, the index step is repeated.

By executing the index step, the wire bending back step, and the wire insertion step as described above repeatedly in that order, the wire 3 can be inserted in wave form into the respective slots 1b of the multi-pole armature 1. When the respective steps have been executed repeatedly in succession until the bent-back wire 3 is inserted into all of the slot 1b sandwiching the magnetic pole 2 of the multi-pole armature 1, the winding operation is complete.

According to the embodiment described above, following actions and effects are obtained.

The wire 3 fed from the nozzle 13 to the first end side 1c of the magnetic pole 2 in the winding position is guided by the first latch pawl 14 from the first end side 1c to the second end side 1d of the multi-pole armature 1 and thereby bent back. The wire 3 is then inserted into the slots 1b on both sides of the magnetic pole 2 in the winding position. In the first and second latch pawls 14, 33 that bend the wire 3 back, the width A thereof in the circumferential direction of the multi-pole armature 1 is set at a width enabling the wire 3 wound around and bent back by the first and second latch pawls 14, 33 to be inserted into the slots 1b, 1b on both sides of the one or more magnetic poles 2 in the winding position. Accordingly, by moving the wire 3 bent back by the first and second latch pawls 14, 33 in the radial direction of the multi-pole armature 1, the bent-back wire 3 can be inserted into the slots 1b, 1b on both sides of the magnetic pole 2 without deforming. Hence, in this embodiment, the bent-back wire 3 is inserted simultaneously into the slots 1b on both sides of the magnetic pole 2, and there is therefore no need to wind the wire 3 in the circumferential direction of the multi-pole armature by moving the latch pawls and the nozzle in the circumferential direction. According to this embodiment, therefore, no time is required to guide the wire 3 in the circumferential direction, and as a result, the winding speed of the wire 3 can be increased sufficiently.

Further, the bent-back wire 3 is inserted into the slots 1b by moving the wire 3 in the radial direction of the multi-pole armature 1 while maintaining the interval formed therein. By setting the interval between the mutually parallel extending portions of the bent-back wire 3 to be equal to or slightly larger than the circumferential direction width of the magnetic pole into which the coil is to be inserted, the extending portions 3b, 3c do not scrape against the slots 1b and the magnetic pole 2 excessively during insertion. Accordingly, the wire is not damaged by such scraping. Furthermore, only the wire 3 enters the slot 1b, and therefore, even when the width W of the slot 1b into which the wire 3 is inserted is so narrow that the nozzle 13 is unable to enter the slot 1b, the wire 3 can be inserted into the slot 1b reliably without being damaged.

Embodiments of this invention were described above, but the above embodiments are merely examples of applications of this invention, and the technical scope of this invention is not limited to the specific constitutions of the above embodiments.

In the embodiment described above, the bent-back wire 3 is inserted into the slots 1b formed on both sides of a single magnetic pole 2 in the circumferential direction of the single magnetic pole 2. Accordingly, the Y axis direction width dimension A of the first latch pawl 14 and the second latch pawl 33 is set to be equal to or slightly larger than the circumferential direction width B of the single magnetic pole 2. However, the bent-back wire 3 is not limited to being inserted into the slots 1b, 1b on both sides of a single magnetic pole 2, and so-called distributed winding, in which the wire 3 is inserted into the slots 1b, 1b on both sides of a plurality of magnetic poles 2, may be performed instead. In the case of so-called distributed winding, in which the wire 3 is inserted into the slots 1b, 1b on both sides of a plurality of magnetic poles 2, the Y axis direction width dimension A of the first latch pawl 14 and the second latch pawl 33 that bend the wire 3 back is set to be equal to or slightly larger than an overall circumferential direction width of the plurality of magnetic poles 2. As a result, so-called distributed winding, in which the bent-back wire 3 is inserted into the slots 1b, 1b on both sides of the plurality of magnetic poles 2, can be performed.

Further, the multi-pole armature 1 employed in the embodiment described above is used in a resolver, and the plurality of magnetic poles 2 project radially from the annular portion 1a toward the radial direction outer side. However, the multi-pole armature 1 subjected to winding is not limited to an armature used in a resolver, and may be an armature used in a motor. Furthermore, although not illustrated in the drawings, the plurality of magnetic poles of the multi-pole armature 1 may be configured to project centrally from the annular portion toward a radial direction inner side.

Moreover, in the case described in the above embodiment, the angular tube-shaped nozzle 13, in which a plurality of the wires 3 extending in the Y axis direction can be passed through the nozzle 13 while arranged in the Z axis direction, is used such that the plurality of wires 3 fed from the nozzle 13 are wound simultaneously. However, the nozzle 13 may be configured to feed a single wire 3, and may be formed in a cylindrical shape.

Further, in the case described in the above embodiment, the multi-pole armature 1 is rotated in the direction indicated by the dot-dash line arrow in FIG. 5 during the index step. Instead, however, the multi-pole armature 1 may be rotated in an opposite direction to the direction indicated by the dot-dash line arrow in FIG. 5 during the index step. Furthermore, successive winding may be performed by rotating the multi-pole armature 1 in the direction indicated by the dot-dash line arrow in FIG. 5, whereupon the winding may be continued by rotating the multi-pole armature 1 in the opposite direction to the direction indicated by the dot-dash line arrow.

Moreover, in the embodiment described above, the first latch pawl 14 is attached to the tip end of the extension portion 15b so as to be oriented downward in the Z axis direction, while the second latch pawl 33 is attached to the tip end of the extension portion 35b so as to be oriented upward in the Z axis direction. Instead, however, the first latch pawl 14 may be attached to the tip end of the extension portion 15b so as to be oriented upward in the Z axis direction, and the second latch pawl 33 may be attached to the tip end of the extension portion 35b so as to be oriented downward in the Z axis direction.

Furthermore, in the embodiment described above, the multi-pole armature 1 includes the straight slots 1b formed parallel to the central axis of the annular portion 1a. As long as the slots 1b are straight, however, a so-called skewed multi-pole armature 1, in which the multi-pole armature 1 is skewed such that the slots 1b are inclined while remaining parallel to each other, may be used instead. Likewise with a skewed multi-pole armature 1, as long as the slots 1b are straight, the bent-back wire 3 can be inserted into the slots 1b on both sides of the magnetic pole 2 without being damaged.

This application claims priority based on Japanese Patent Application No. 2012-206684 filed with the Japan Patent Office on Sep. 20, 2012, the entire contents of which are incorporated into this specification.

The invention claimed is:

1. A winding apparatus comprising:
   a nozzle that is provided on a first end side of a multi-pole armature and configured to feed a wire to a first end side of a magnetic pole in a winding position;
   a first latch pawl capable of latching the wire fed from the nozzle;
   a first latch pawl moving mechanism that is configured to move the first latch pawl from the first end side to a second end side of the multi-pole armature, and then move the first latch pawl moved to the second end side of the multi-pole armature in both a radial direction and a circumferential direction of the multi-pole armature; and
   a nozzle moving mechanism that is configured to move the nozzle in both the radial direction and the circumferential direction of the multi-pole armature,
   wherein a width of the first latch pawl in the circumferential direction of the multi-pole armature is set at a width enabling insertion of the wire wound around and bent back by the first latch pawl into slots formed on both sides of one or more of the magnetic poles in the winding position.

2. The winding apparatus according to claim 1, further comprising:
   a second latch pawl provided on the first end side of the multi-pole armature to be capable of latching the wire fed from the nozzle; and
   a second latch pawl moving mechanism that is configured to move the second latch pawl in the radial direction of the multi-pole armature,
   wherein a width of the second latch pawl in the circumferential direction of the multi-pole armature is set at a width enabling insertion of the wire wound around and bent back by the second latch pawl into the slots formed on both sides of the one or more magnetic poles in the winding position.

3. The winding apparatus according to claim 1, further comprising an index mechanism that is configured to send one or more of the magnetic poles to the winding position in succession by rotating the multi-pole armature.

4. The winding apparatus according to claim 1, further comprising:
   a shutter member that is configured to restrain the wire inserted into the slots on both sides of the one or more magnetic poles in the winding position between the multi-pole armature and the first latch pawl on the second end side of the multi-pole armature; and
   a member moving mechanism that is configured to move the shutter member between a restraining position for restraining the wire and a removed position removed from the restraining position.

* * * * *